Aug. 27, 1929.   W. F. STIMPSON ET AL   1,725,942
SHUT-OFF MECHANISM FOR COFFEE MILL HOPPERS
Filed Jan. 10, 1927
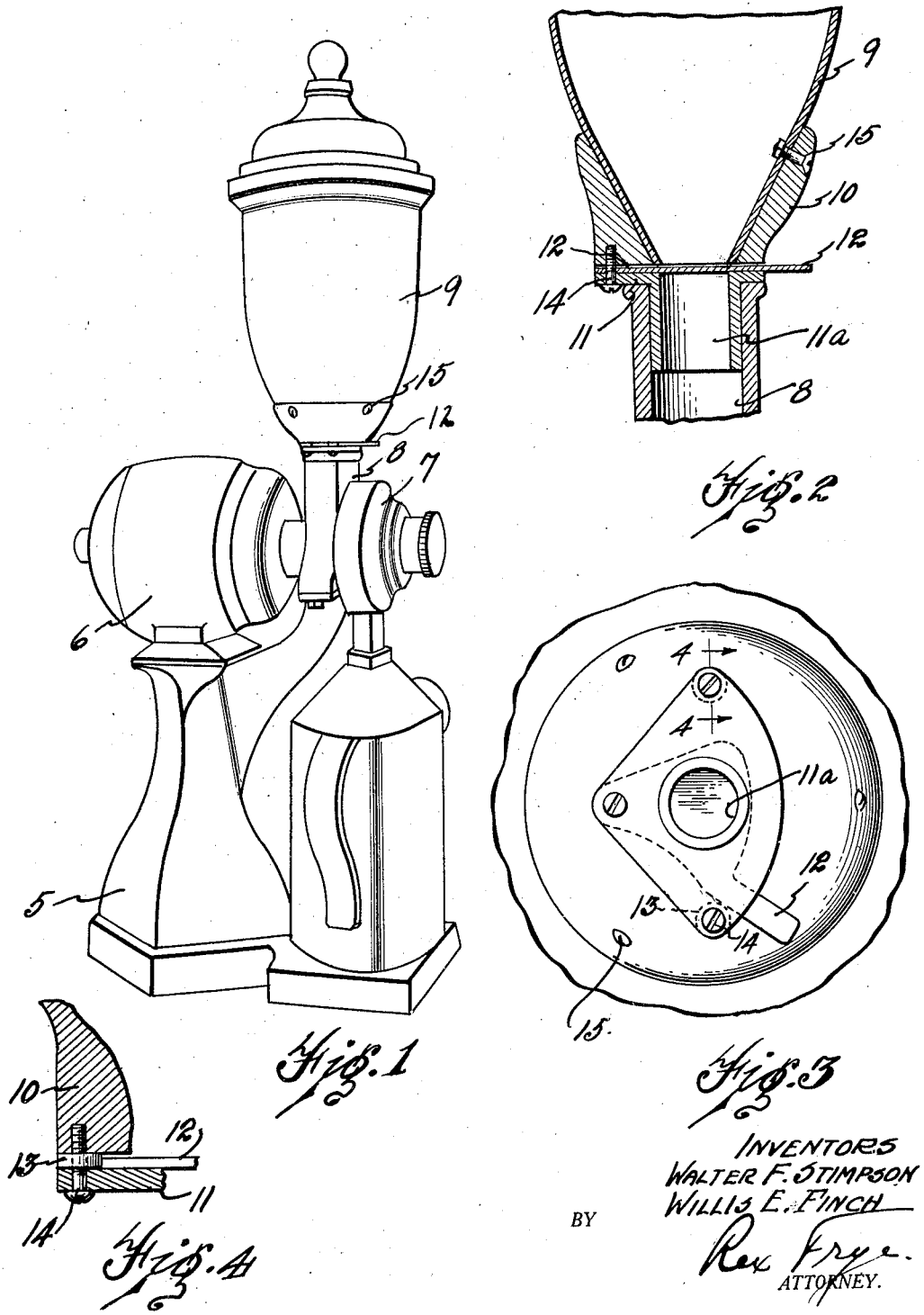
INVENTORS
WALTER F. STIMPSON
WILLIS E. FINCH
BY
Rex Frye
ATTORNEY.

Patented Aug. 27, 1929.

1,725,942

UNITED STATES PATENT OFFICE.

WALTER F. STIMPSON AND WILLIS E. FINCH, OF LOUISVILLE, KENTUCKY; SAID FINCH ASSIGNOR TO SAID STIMPSON.

SHUT-OFF MECHANISM FOR COFFEE-MILL HOPPERS.

Application filed January 10, 1927. Serial No. 160,051.

This invention relates to shut-off mechanism for coffee mill hoppers and the like, and has for its principal object the arrangement of the shut-off mechanism as a part of the hopper itself and independent of the grinder housing.

Another object of this invention is the mounting of the shut-off mechanism so that it gives stability to the neck of the hopper and so reinforces same as to overcome the tendency to bend the small neck of the hopper when it is positioned within the grinder housing.

A further object of our invention is the provision of the shut-off mechanism adjacent the lower extremity of the hopper throat and yet comparatively close to the grinding mechanism, whereby, in the event of accidental or deliberate stoppage of the grinding mechanism before all coffee in the hopper has been ground, the shut-off can be closed, with the unground coffee in the hopper which can be then removed from the grinder housing. The positioning of the shut-off close to the grinding mechanism leaves only a small quantity of coffee in the grinder housing whenever such stoppage occurs.

Other objects and advantages will be apparent from the following description, wherein reference is made to the accompanying drawings illustrating a preferred embodiment of our invention and wherein similar reference numerals designate similar parts throughout the several views.

In the drawings:

Fig. 1 is a perspective view of a coffee mill having a hopper mounted thereon and equipped with our improved shut-off mechanism.

Fig. 2 is a detail enlarged vertical section through the shut-off mechanism, lower extremity of the hopper and the upper extremity of the grinder housing.

Fig. 3 is a bottom plan view of the hopper and shut-off mechanism removed from the grinder housing, and Fig. 4 is a detail sectional view taken substantially on the line 4—4 of Fig. 3.

Referring now to the drawings, the numeral 5 designates the base of a coffee mill upon which is supported an electric motor 6 and the grinding elements driven by the motor and encased within the housing 7. The upper portion of the housing 7 terminates in a vertically disposed inlet throat 8, preferably tubular adjacent its upper extremity and adapted to conduct coffee, etc. from the hopper 9 to the grinding burrs within the housing 7. The illustrated embodiment depicts a well-known type of coffee mill extensively sold in the trade, and with which our improved shut-off mechanism hereinafter described has been found to be particularly useful. It is to be understood, however, that the illustration herein is merely for purposes of exemplification, and that our improved shut-off mechanism is adapted for use with other types and makes of coffee mills, etc.

The shut-off mechanism forming the claimed disclosure herein is adapted to be firmly secured upon and form a substantial part of the hopper 9. As herein shown our improved shut-off mechanism comprises an upper or hopper reinforcing member 10 interiorly shaped to snugly fit over the lower portion of the hopper 9 to reinforce same, and a lower or supporting member 11 having a depending neck 11$^a$ shaped to snugly fit within the upper portion of the throat 8 of the grinder casing. Adjacent surfaces of the members 10 and 11 are spaced from each other by a distance slightly greater than the thickness of the pivoted shut-off gate 12, whereby the gate may be easily swung into and out of closed position and yet will be supported against distortion under the weight of material within the hopper by the lower member 11. In the illustrated embodiment the desired distance between the upper and lower members 10 and 11 has been secured by providing a plurality of spacers 13 between the members and surrounding screws 14 passing through the lower member 11 and threaded into the upper member 10 (note Fig. 4). One of the screws 14 is also utilized as a fulcrum for the pivoted gate 12, as best shown in Figs. 2 and 3. The upper member 10 is preferably shaped with a conical upper portion substantially conforming with the contiguous portion of the hopper 9 and a triangular lower portion, whereby portions of solid metal extend away from the central opening in the member 10 to provide ample metal to receive the screws 14 connecting the upper and lower shut-off members. The upper portion of the lower member 11 is preferably shaped substantially in conformance with the shape of the triangular lower portion of the upper member 10 to give a pleasing symmetry to the contour of the hopper and connected shut-off mechanism.

In practice, our improved shut-off mechanism is preliminarily assembled by threading home the screws 14 to substantially the positions shown in Figs. 2 and 4, after the gate 12 and spacers 13 of the desired thickness have been mounted over the threaded portions of the screws 14. The assembled shut-off mechanism is then firmly secured upon the hopper 9, as by means of fasteners 15. The shut-off mechanism is now carried by and forms a substantial part of the hopper 9, reinforcing the lower portion of the hopper and serving as a means for mounting the hopper within the throat 8 of the grinder housing, the neck 11$^a$ of the shut-off mechanism fitting within the passageway in the throat 8 and the lower surface of the member 11 resting upon the upper face of the throat 8, substantially as shown in Fig. 2. The pivoted gate 12 can then be swung to cover or uncover the central aperture in the hopper 9, as desired. When the gate 12 is swung to open position coffee or other material to be ground placed within the hopper 9 passes therefrom through the neck 11$^a$ of the shut-off mechanism into the grinder housing, where it is suitably ground by revolving burrs (not shown). Should it happen that a nail or other injurious foreign substance engages the revolving burrs, means are ordinarily provided for automatically disengaging the burrs from the driving spindle operated by the motor 6, whereupon further grinding is stopped until the automatic obstruction release has been reset. An example of such automatic obstruction release for coffee mills is shown in the Patent, No. 1,587,104, granted June 1, 1926, to Walter F. Stimpson. In the event that the grinding burrs become disengaged from the driving spindle, the shut-off gate 12 can be swung to closed position and the hopper removed from the grinder housing with the unground coffee retained therein. Then after the nail or other injurious substance has been removed and the obstruction release reset, the hopper can be replaced upon the grinder housing and the shut-off gate 12 swung to permit the resumption of the flow of unground coffee, etc. to the grinder housing.

While it will be apparent that the illustrated embodiment of our invention herein disclosed is well calculated to adequately fulfill the objects and advantages primarily stated, it is to be understood that the invention is susceptible to variation, modification and change within the spirit and scope of the subjoined claims.

Having described our invention, we claim:

1. Shut-off mechanism for coffee mill hoppers comprising a centrally apertured member secured upon the hopper to reinforce the lower portion thereof for a distance above its lower edge, a shut-off gate pivotally mounted to cover or uncover said central aperture, and means secured to said member for positioning the hopper upon a grinding housing.

2. Shut-off mechanism for coffee mill hoppers comprising a centrally apertured member secured upon the hopper to reinforce the lower portion thereof for a distance above its lower edge, a shut-off gate pivotally mounted to cover or uncover said central aperture, and means secured to said member for positioning the hopper upon a grinding housing, comprising a lower supporting member having an apertured neck arranged in alignment with said central aperture and adapted to enter the grinder housing.

3. Shut-off mechanism for coffee mill hoppers comprising a pair of centrally apertured members secured upon the hopper in spaced relation to each other, the upper of said members substantially conforming to and externally reinforcing the lower portion of the hopper and the lower of said members being secured to the upper member by adjustable fasteners, a shut-off gate arranged between said members and fulcrumed upon one of said fasteners, and spacers of slightly greater thickness than the shut-off gate surrounding the others of said fasteners between the members.

4. Shut-off mechanism for coffee mill hoppers comprising a centrally apertured member arranged with its central aperture shaped to snugly fit around the lower portion of the hopper to reinforce the lower portion of the hopper, a shut-off gate pivotally mounted upon said member to swing into and out of closing relation to the hopper, and means spacedly secured to said member for positioning the hopper and associated members upon a grinding housing.

In witness whereof we hereunto set our hands and seals.

WALTER F. STIMPSON.
WILLIS E. FINCH.